US011196324B2

(12) United States Patent
Matsubayashi et al.

(10) Patent No.: US 11,196,324 B2
(45) Date of Patent: Dec. 7, 2021

(54) METHOD OF MANUFACTURING STACKED CORE WITH ADHESIVE

(71) Applicant: Mitsui High-tec, Inc., Kitakyushu (JP)

(72) Inventors: Satoshi Matsubayashi, Kitakyushu (JP); Yukio Matsunaga, Kitakyushu (JP); Yusuke Hasuo, Kitakyushu (JP); Yusuke Eto, Kitakyushu (JP); Hayato Nakayama, Kitakyushu (JP)

( * ) Notice: Subject to any disclaimer, the term of this patent is extended or adjusted under 35 U.S.C. 154(b) by 165 days.

(21) Appl. No.: 16/447,889

(22) Filed: Jun. 20, 2019

(65) Prior Publication Data
US 2019/0305654 A1 Oct. 3, 2019

Related U.S. Application Data

(63) Continuation of application No. PCT/JP2017/036677, filed on Oct. 10, 2017.

(30) Foreign Application Priority Data

Dec. 22, 2016 (JP) .............................. JP2016-249398

(51) Int. Cl.
| | |
|---|---|
| *H02K 15/02* | (2006.01) |
| *B21D 39/03* | (2006.01) |
| *H02K 1/16* | (2006.01) |
| *B21D 28/02* | (2006.01) |
| *H01F 41/02* | (2006.01) |

(52) U.S. Cl.
CPC ........... *H02K 15/024* (2013.01); *B21D 28/02* (2013.01); *B21D 39/03* (2013.01); *H01F 41/02* (2013.01); *H02K 1/16* (2013.01); *H02K 15/02* (2013.01)

(58) Field of Classification Search
CPC ......... B21D 28/02; B21D 39/03; H01F 41/02; H02K 15/02; H02K 15/024; H02K 1/16
See application file for complete search history.

(56) References Cited

U.S. PATENT DOCUMENTS

| | | | |
|---|---|---|---|
| 5,649,349 A | 6/1997 | Greenway | |
| 10,201,844 B2 * | 2/2019 | Nishinaka | ................ B05D 1/26 |

(Continued)

FOREIGN PATENT DOCUMENTS

| | | |
|---|---|---|
| CN | 102132366 | 7/2011 |
| CN | 105281457 | 1/2016 |

(Continued)

OTHER PUBLICATIONS

International Preliminary Report on Patentability with Written Opinion dated Jul. 4, 2019 for PCT/JP2017/036677.

(Continued)

*Primary Examiner* — Minh N Trinh
(74) *Attorney, Agent, or Firm* — Soei Patent & Law Firm

(57) ABSTRACT

A method of manufacturing a stacked core includes: forming a stack by stacking a plurality of core members, each of the plurality of core members including one or more blanked members blanked by a die from a metal plate along a predetermined shape; removing one core member of the plurality of core members from the stack; supplying adhesive to the one core member removed from the stack; and stacking the one core member next to an adjacent core member of the plurality of core members so that the adhesive is placed between the one core member and the adjacent core member.

6 Claims, 11 Drawing Sheets

(56) References Cited

U.S. PATENT DOCUMENTS

| | | | |
|---|---|---|---|
| 10,923,995 B2 * | 2/2021 | Chung | B32B 15/011 |
| 2004/0083600 A1 | 5/2004 | Neuenschwander et al. | |
| 2016/0013709 A1 | 1/2016 | Nagai et al. | |
| 2016/0164350 A1 | 6/2016 | Matsunaga et al. | |
| 2016/0329783 A1 | 11/2016 | Nagai et al. | |
| 2018/0358871 A1 * | 12/2018 | Hasuo | H02K 15/022 |
| 2019/0305654 A1 * | 10/2019 | Matsubayashi | H01F 41/02 |
| 2020/0108591 A1 * | 4/2020 | Matsunaga | H02K 15/024 |

FOREIGN PATENT DOCUMENTS

| | | |
|---|---|---|
| EP | 1441044 | 7/2004 |
| JP | S59-162741 | 9/1984 |
| JP | H10-285889 | 10/1998 |
| JP | 2005-019643 | 1/2005 |
| JP | 2006-334648 | 12/2006 |
| JP | 5357187 | 12/2013 |
| JP | 2014-176891 | 9/2014 |
| JP | 2015-149884 | 8/2015 |
| JP | 2016-111865 | 6/2016 |
| WO | 2016/076321 | 5/2016 |

OTHER PUBLICATIONS

Extended Search Report in corresponding European Application No. 17884198.7, dated Jun. 30, 2020.
International Search Report dated Dec. 26, 2017 for PCT/JP2017/036677.

* cited by examiner

METHOD OF MANUFACTURING STACKED CORE WITH ADHESIVE

CROSS-REFERENCE TO RELATED APPLICATIONS

This application is a continuation application of PCT Application No. PCT/JP2017/036677 filed on Oct. 10, 2017, which claims the benefit of priority from Japanese Patent Application No. 2016-249398, filed on Dec. 22, 2016, the entire contents of which are incorporated herein by reference.

FIELD

The present disclosure relates to a method of manufacturing a stacked core and an apparatus for manufacturing a stacked core.

BACKGROUND

Japanese Unexamined Patent Publication No. 2006-334648 discloses a method of manufacturing a stacked core in which the following steps are all performed inside of a die. While a coil that is a band-like metal plate (workpiece plate) wound in a coil-like shape is being sent out intermittently from an uncoiler, an adhesive is applied to one side of the metal plate. Additionally, the method includes forming one blanked member by blanking the metal plate with a punch, and stacking the one blanked member with another blanked member having been already blanked, while allowing the blanked members to adhere to each other with the adhesive.

In order to suppress wear of the punch and to improve the blanking quality of the blanked member press oil (also referred to as stamping oil) is generally applied to the coil member. If the adhesive is applied to the metal plate with some oil remaining, in an attempt to bond the blanked members to each other, the adhesion performance of the adhesive is affected thereby. To address this issue, Japanese Unexamined Patent Publication No. 2006-334648 discloses adding a solidification accelerator to the oil, and bonding the blanked members with the adhesive without removing the oil.

SUMMARY

An example method of manufacturing a stacked core may comprise forming a stack by stacking a plurality of core members. Each of the plurality of core members may comprise one blanked member blanked by a die from a metal plate along a predetermined shape, or a block in which a plurality of blanked members blanked by the die from the metal plate along a predetermined shape are joined together. Additionally, the method may comprise supplying adhesive to one core member of the plurality of core members, the one core member taken out from the stack, and stacking the one core member and another core member of the plurality of core members so that the adhesive is placed between the one core member and the other core member.

An example apparatus for manufacturing a stacked core may comprise a die configured to form a plurality of core members from a metal plate and to form a stack by stacking the plurality of core members. Each of the plurality of core members may comprise one blanked member blanked by the die from the metal plate along a predetermined shape, or a block in which a plurality of blanked members blanked by the die from the metal plate along a predetermined shape are joined together. Additionally, the apparatus may comprise a holding mechanism configured to hold a core member of the plurality of core members, a supplying mechanism configured to supply adhesive, and a control unit. The control unit may be configured to control the die to form the stack, and to control the holding mechanism to take out one core member of the plurality of core members from the stack. Still further, the control unit may be configured to control the supplying mechanism to supply the adhesive to the one core member taken out by the holding mechanism, and to control the holding mechanism to stack the one core member held by the holding mechanism to another core member of the plurality of core members. Accordingly, the adhesive may be sandwiched between the one core member and the other core member.

DETAILED DESCRIPTION

In the following description, with reference to the drawings, the same reference numbers are assigned to the same components or to similar components having the same function, and overlapping description is omitted.

Structure of Stacked Stator Core

Figure 1:
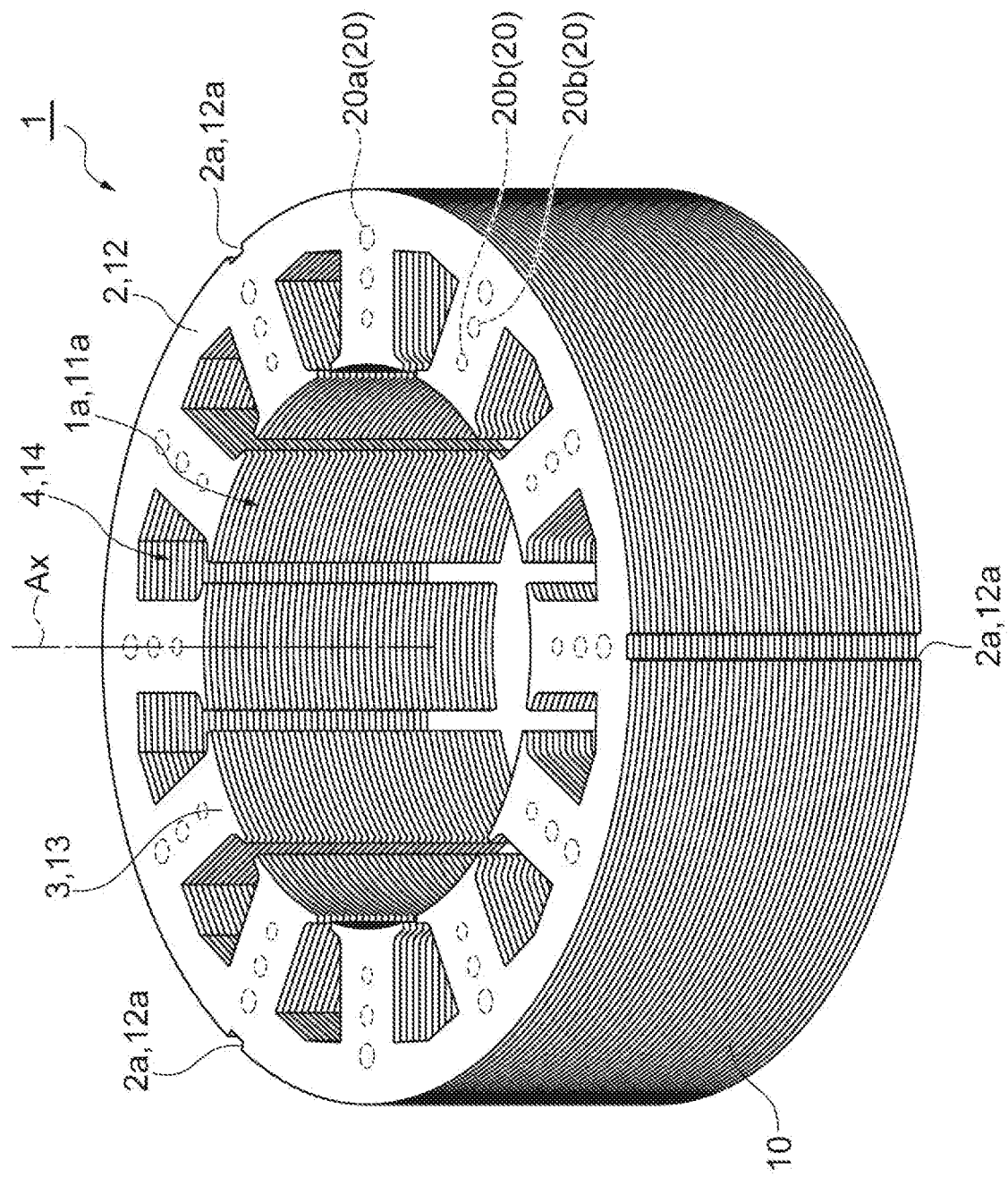
FIG. 1 is a perspective view illustrating an example stacked stator core.

FIG. 1 illustrates an example structure of a stacked stator core 1. The stacked stator core 1 is a part of a stator. A stator is a stacked stator core 1 with a coil mounted thereon. A stator combined with a rotor makes up a motor. The stacked stator core 1 has a tubular shape. In some examples, a through-hole 1a extending along a central axis Ax is provided at the center of the stacked stator core 1. A rotor can then be placed inside of the through-hole 1a.

The stacked stator core 1 includes a yoke portion 2 (main body) and a plurality of teeth portions 3. The yoke portion 2 has an annular shape, and extends in a manner surrounding the central axis Ax. The width in the radial direction, the inner diameter, the outer diameter, and the thickness of the yoke portion 2 may be set to various sizes depending on the use and the performance of the motor. A plurality of grooves 2a extending along the central axis Ax are provided to the outer circumferential surface of the yoke portion 2. The grooves 2a extend between one end surface (the top surface in FIG. 1) to the other end surface (the bottom surface in FIG. 1) of the stacked stator core 1. In some examples, the outer circumferential surface of the yoke portion 2 has three grooves 2a, at an interval of substantially 120° about the central axis Ax.

The teeth portions 3 extend in the radial direction of the yoke portion 2, from the inner rim of the yoke portion 2 toward the central axis Ax. In some examples, the teeth portions 3 protrude from the inner rim of the yoke portion 2 toward the central axis Ax. In the stacked stator core 1, twelve teeth portions 3 are provided integrally to the yoke portion 2. The teeth portions 3 are arranged at a substantially equal interval along the circumferential direction of the yoke portion 2. Slots 4 located between the adjacent teeth portions 3 provide spaces in which coils may be placed.

The stacked stator core 1 includes a plurality of workpieces 10 (core members) which are stacked on top of one another. In some examples, the workpiece 10 has a shape corresponding to the shape of the stacked stator core 1. A through-hole 11a is provided at the center of the workpiece 10. The workpiece 10 has a yoke piece portion 12 corresponding to the yoke portion 2, and a plurality of teeth piece portions 13 corresponding to the respective teeth portions 3. Cutouts 12a corresponding to the respective grooves 2a are provided on the outer circumference of the yoke piece portion 12. Slots 14 (through-holes) corresponding to the slots 4 are located between the adjacent teeth piece portions 13.

The workpieces 10 that are adjacent in a stacking direction (the direction in which the central axis Ax extends) are joined with each other with adhesive 20. For example, a plurality of spots of adhesive 20a are provided to a surface of the yoke piece portion 12 at a substantially equal interval, in a manner aligned along the circumferential direction of the yoke piece portion 12. In some examples, the spots of the adhesive 20a are positioned correspondingly to the respective base ends of the teeth piece portions 13. Two spots of adhesive 20b are provided on the surface of each teeth piece portion 13. The two spots of adhesive 20b are aligned in the direction in which the teeth piece portion 13 extends (in the radial direction of the yoke piece portion 12), along a center of the teeth piece portion 13 in the width direction. Therefore, one spot of adhesive 20a and two spots of adhesive 20b that are provided to the teeth piece portion 13 are aligned in the radial direction of the yoke piece portion 12. The areas of these three spots of adhesive 20a, 20b, 20b may increase in a direction from the central axis Ax toward the outer side, as illustrated in FIG. 1, may be substantially equal, or may decrease in the direction from the central axis Ax toward the outer side.

Structure of Stack

Figure 2:
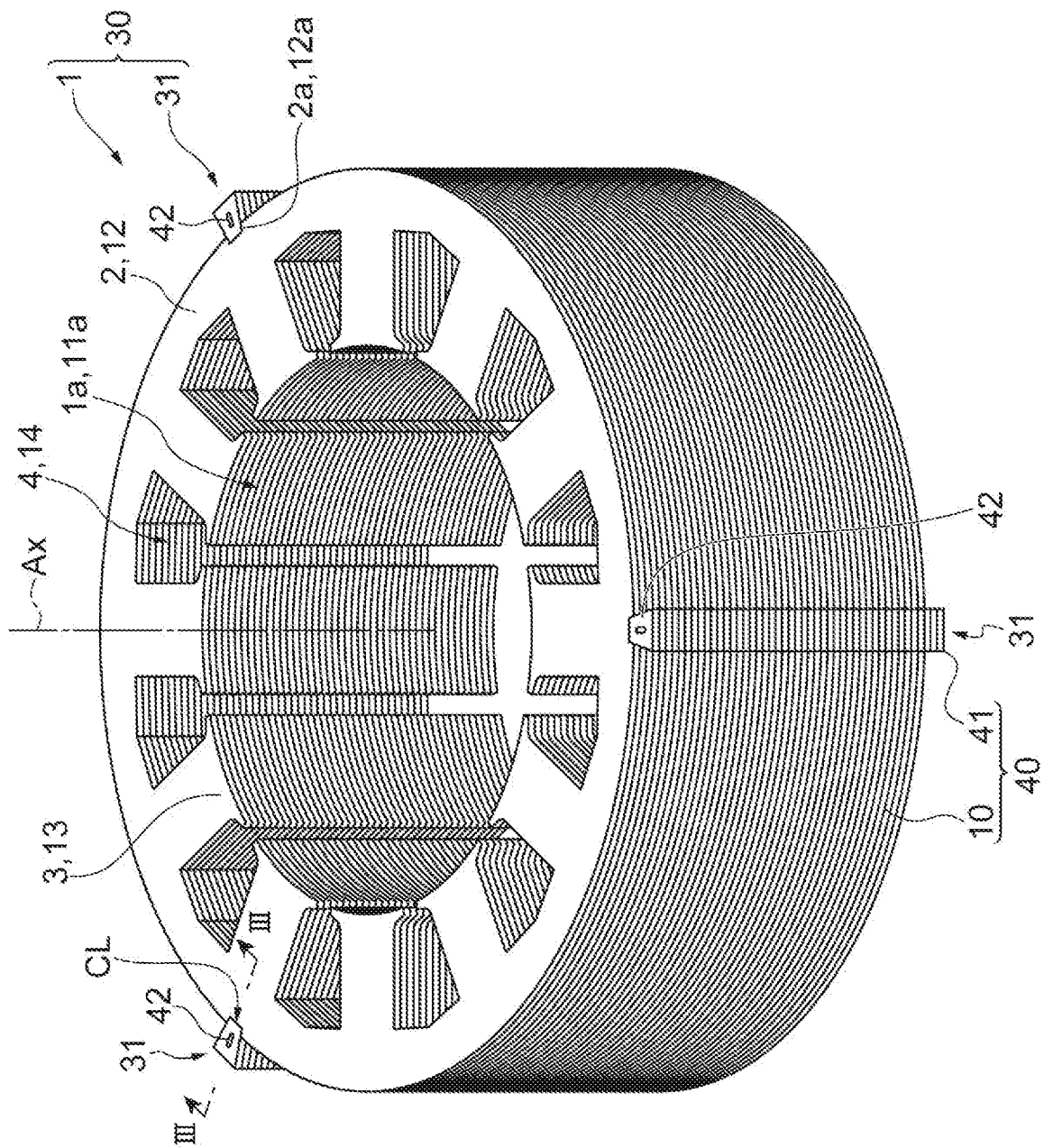
FIG. 2 is a perspective view illustrating an example stack.
Figure 3:
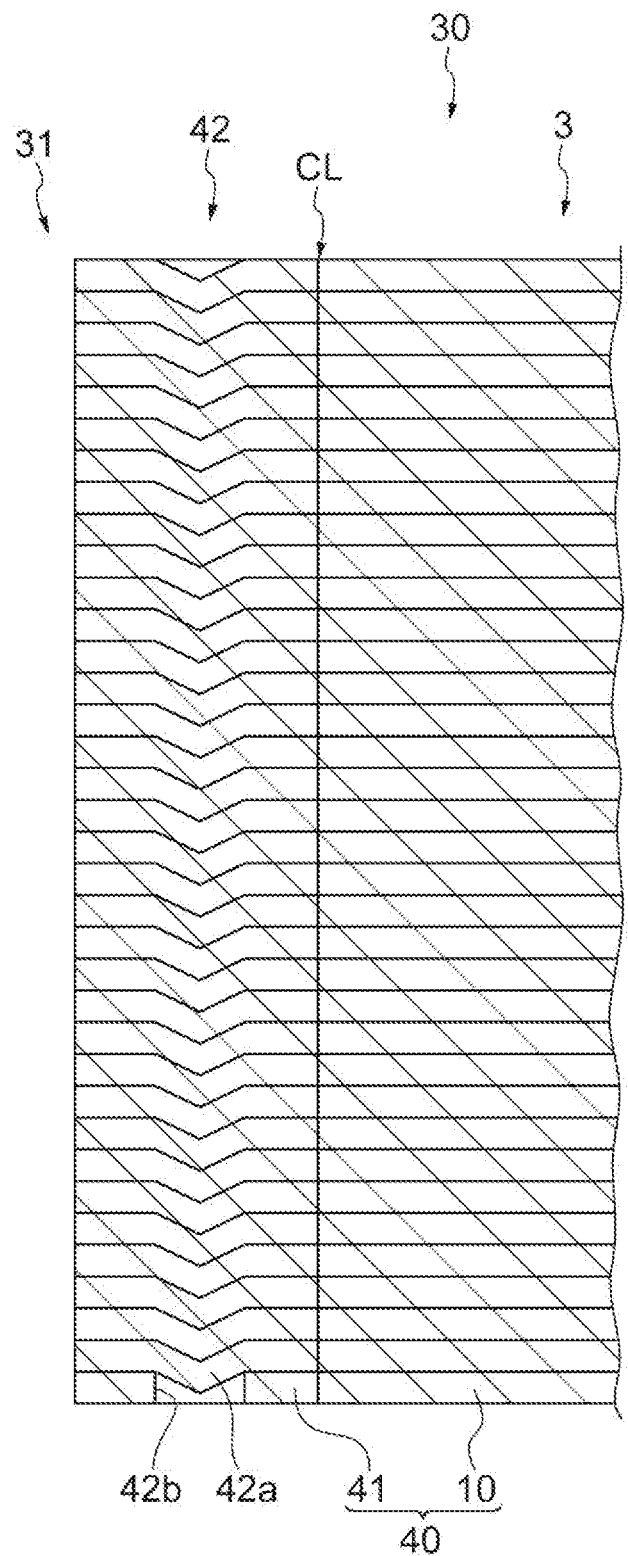
FIG. 3 is a sectional view across the line III-III in FIG. 2.
Figure 4:
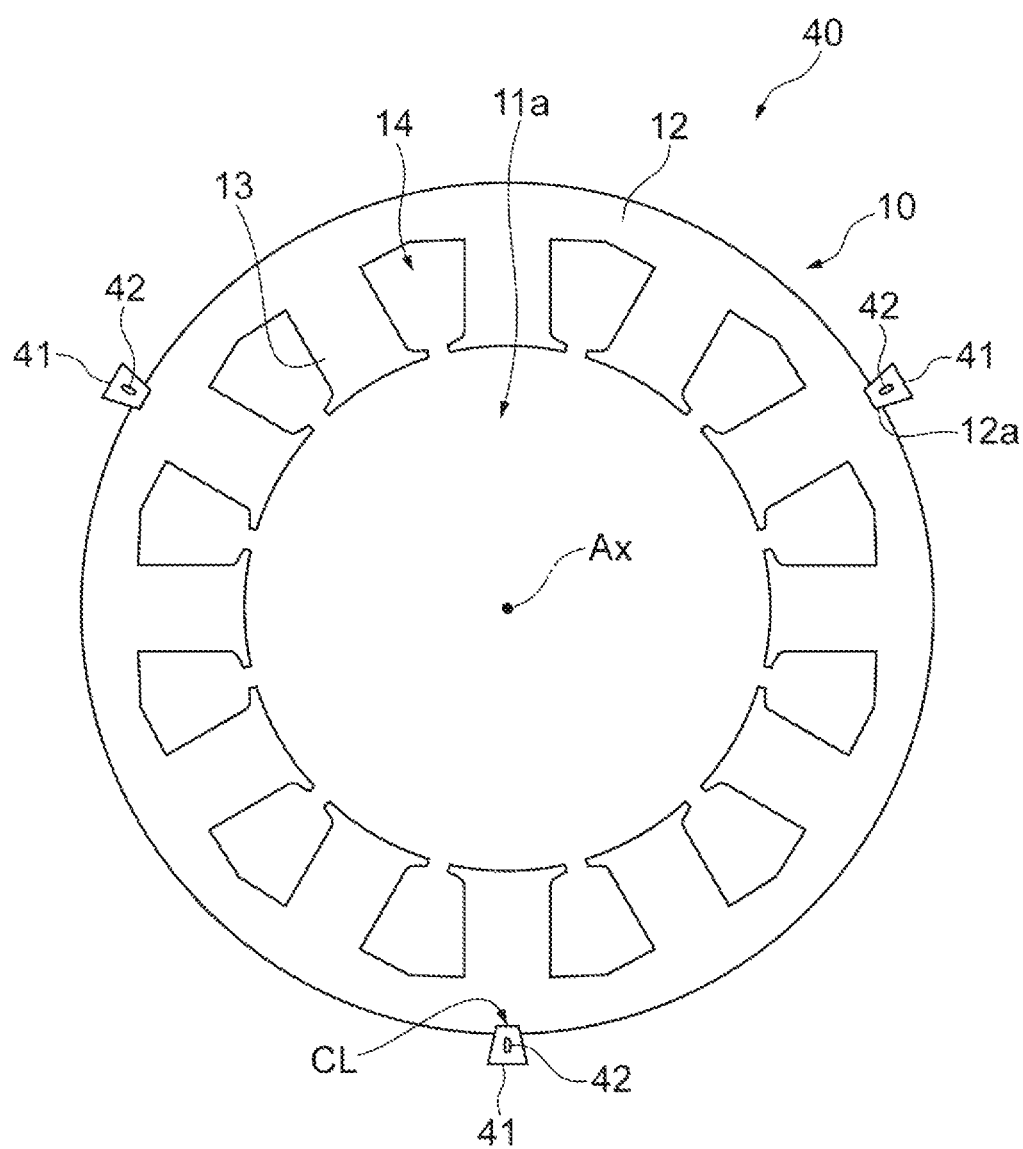
FIG. 4 is a plan view illustrating an example blanked member.
Figure 5:
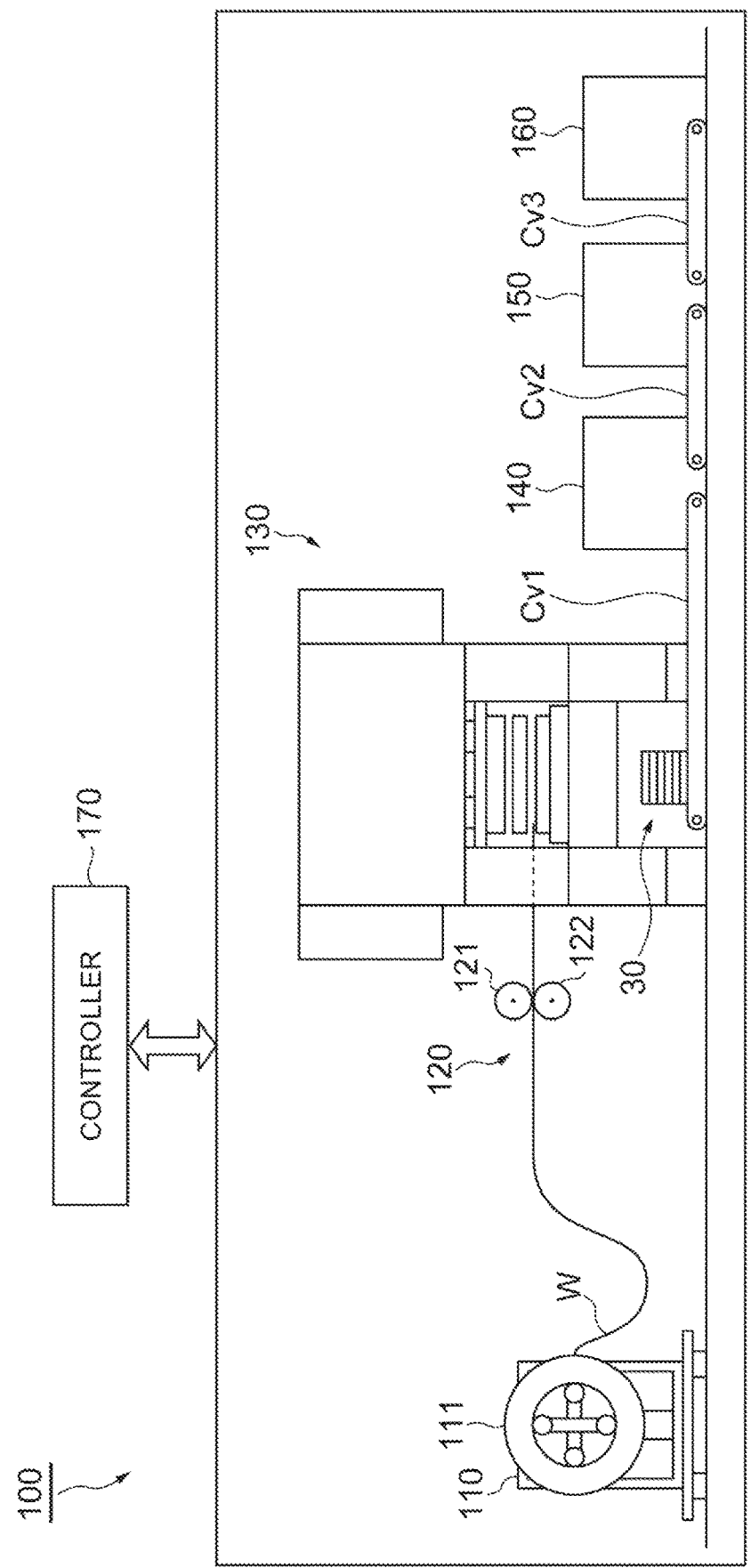
FIG. 5 is a general schematic illustrating an example apparatus for manufacturing a stacked stator core.

FIGS. 2 to 4 illustrate an example stack 30. The stack 30 is a structure with temporarily-connecting tab portions 31 fitted into the respective grooves 2a of the stacked stator core 1. The stack 30 is formed by a plurality of blanked members 40 which are stacked on top of each other. In some examples, the blanked member 40 has a shape corresponding to the shape of the stack 30. The blanked member 40 may comprise a structure in which temporarily-connecting tab pieces 41 corresponding to a temporarily-connecting tab portion 31 are fitted into the respective cutouts 12a of the workpiece 10.

A cutting line CL is provided between the temporarily-connecting tab piece 41 and the cutout 12a of the workpiece 10. Each cutting line CL may be formed by, for example, lancing or blanking an electrical steel sheet W (which will be described in further detail later), then pushing and press-fitting the lanced or blanked part back into the original electrical steel sheet W. When a lancing or a blanking operation is applied to the electrical steel sheet W, the lanced or blanked part is plastically deformed, and an upper part (the side of a punch 133, which will be described in further detail later) becomes somewhat stretched. Therefore, if such a portion is press-fitted into the original electrical steel sheet W, this part become firmly fitted into the original electrical steel sheet W to such a degree that this part cannot be easily removed manually.

Adjacent blanked members 40 in the stacking direction are fastened to each other by a temporarily-connecting tab 42 via the temporarily-connecting tab piece 41. The temporarily-connecting tab portion 31 may comprise a stack of the temporarily-connecting tab pieces 41 that are stacked on top of one another. The temporarily-connecting tab 42 includes, as illustrated in FIG. 3, bent portions 42a that are formed on the temporarily-connecting tab pieces 41 for the blanked members 40 other than that positioned at the lowest layer of the stack 30, and a through-hole 42b that is formed on the temporarily-connecting tab piece 41 for the blanked member 40 positioned at the lowest layer of the stack 30. The bent portion 42a has a depression that is formed on the front side of the temporarily-connecting tab piece 41, and a projection that is formed on the rear side of the temporarily-connecting tab piece 41. The depression of the bent portion 42a on one temporarily-connecting tab piece 41 is coupled with the projection on the bent portion 42a of another temporarily-connecting tab piece 41 that is adjacent thereto on the front side of the one temporarily-connecting tab piece 41. The projection on the bent portion 42a of the one temporarily-connecting tab piece 41 is coupled with the depression on the bent portion 42a of still another temporarily-connecting tab piece 41 that is adjacent thereto on the rear side of the one temporarily-connecting tab piece 41. The projection on the bent portion 42a of the temporarily-connecting tab piece 41 for the blanked member 40 adjacent to the lowest layer of the stack 30 is coupled with the through-hole 42b. The through-hole 42b may be configured to, when the stacks 30 are manufactured continuously, prevent the bent portion 42a of the stack 30 having been already manufactured from being coupled to a temporarily-connecting tab portion 31 of the stack 30 being manufactured next.

The blanked member 40 may be obtained by processing (e.g., blanking or lancing) the electrical steel sheet W (which will be described in further detail later). The thickness of the blanked member 40 may be set to various sizes depending on the use and the performance of the motor, but may be approximately 0.1 millimeter to 0.5 millimeter, for example.

The stack 30 may be manufactured by a process called "rotational stacking." The rotational stacking process may comprise skewing the relative angles of the blanked members 40 with respect to each other, and stacking the blanked members 40 while rotating blanked members 40. The rotational stacking may be performed mainly to cancel out the deviations in the thickness of the blanked members 40. In the process of obtaining the stack 30, each of the blanked members 40 may be rotationally stacked, or each of unit blocks that is a stack of a predetermined number of blanked members 40 may be rotationally stacked. The angle and the frequency of the rotational stacking may be set to predetermined values.

Apparatus for Manufacturing Stacked Stator Core

FIGS. 5 to 10 illustrate an example apparatus 100 for manufacturing the stacked stator core 1.

The apparatus 100 may be configured to manufacture the stacked stator core 1 from the electrical steel sheet W (workpiece plate) that is a band-like metal plate. The apparatus 100 includes an uncoiler 110, a feeder 120, a blanking device 130 (die), an annealing furnace 140 (oil removing mechanism), a temporarily-connecting tab removing device 150 (temporarily-connecting tab removing mechanism), a stacking device 160, and a controller 170 (control unit).

The uncoiler 110 holds a coil 111 that is a band-like electrical steel sheet W wound in a coil-like shape, in a rotatable manner, with the coil 111 mounted thereon. Oil is applied to substantially the entire electrical steel sheet W making up the coil 111 to suppress wear of a punch 133 (which will be described in further detail later), and to improve blanking quality of the blanked member 40, for example. The feeder 120 includes a pair of rollers 121, 122 that sandwich the electrical steel sheet W from the top and the bottom. The pair of rollers 121, 122 rotates and stops rotating based on an instruction signal from the controller 170, and feeds the electrical steel sheet W into the blanking device 130 sequentially and intermittently.

The length of the electrical steel sheet W making up the coil 111 may be approximately 500 meters to 10000 meters, for example. The thickness of the electrical steel sheet W may be approximately 0.1 millimeter to 0.5 millimeter, for example. The thickness of the electrical steel sheet W may be approximately 0.1 millimeter to 0.3 millimeter, for example, from the viewpoint of achieving the stacked stator core 1 with superior magnetic characteristics. The width of the electrical steel sheet W may be approximately 50 millimeters to 500 millimeters, for example.

The blanking device 130 may be configured to operate based on an instruction signal from the controller 170. The blanking device 130 may be configured to form the blanked members 40 by blanking the electrical steel sheet W fed by the feeder 120 sequentially and intermittently, and to manufacture the stack 30 by stacking the blanked members 40, successively. The blanking device 130 may include, as illustrated in FIG. 6, a lower die 131, a die plate 132, a stripper (not illustrated), an upper die (not illustrated), and the punch 133.

The lower die 131 holds the die plate 132 that is placed on the lower die 131. The lower die 131 has a discharge hole 131a through which the blanked member 40 blanked out of the electrical steel sheet W is discharged, at a position corresponding to the punch 133. A cylinder 131b, a stage 131c, and a pusher 131d are arranged inside of the discharge hole 131a, as illustrated in FIGS. 6 and 7.

Figure 6:
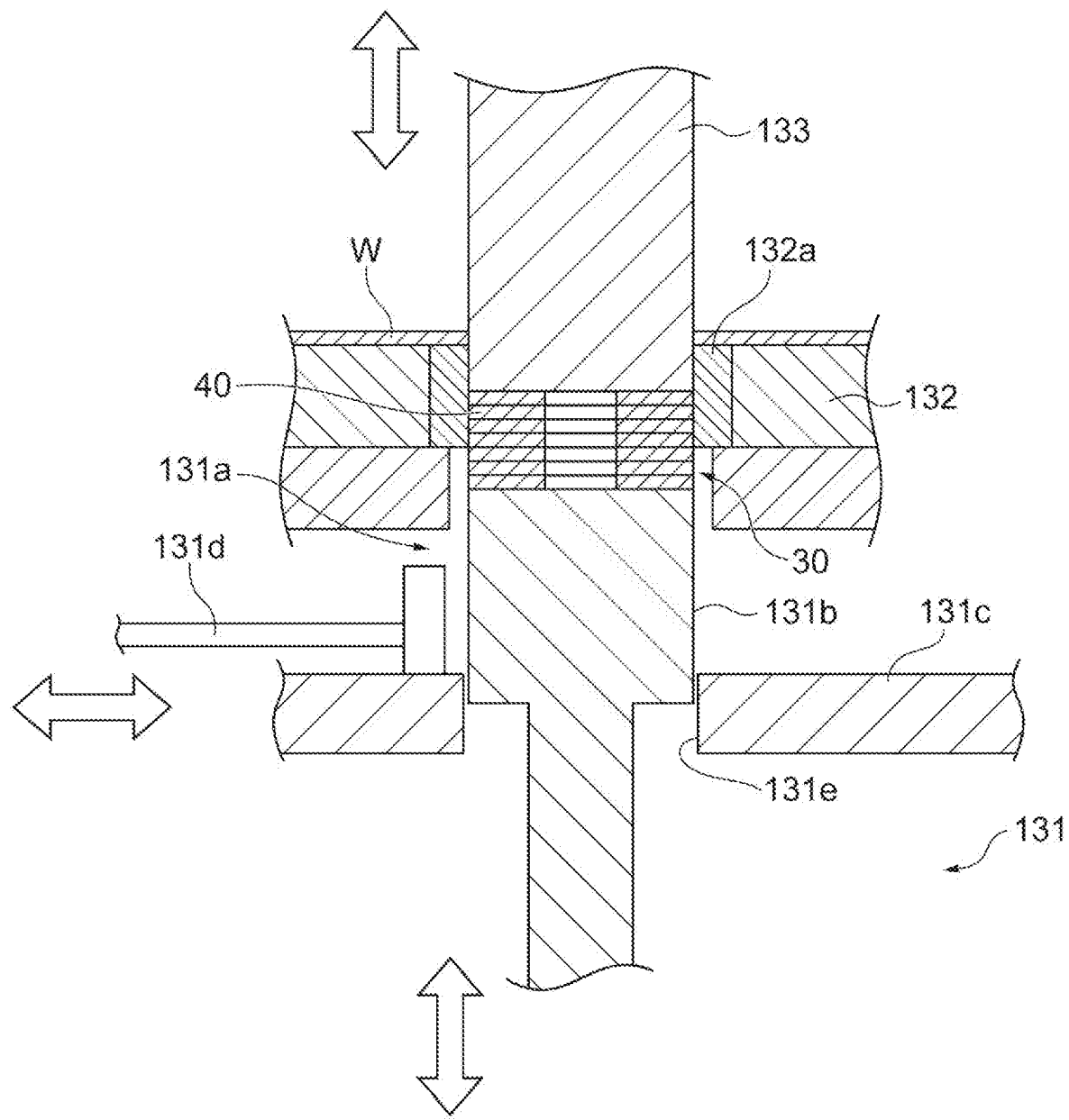
FIG. 6 is a sectional view schematically illustrating an example mechanism for stacking blanked members, and an example mechanism for discharging a stack out of a die.
Figure 7:
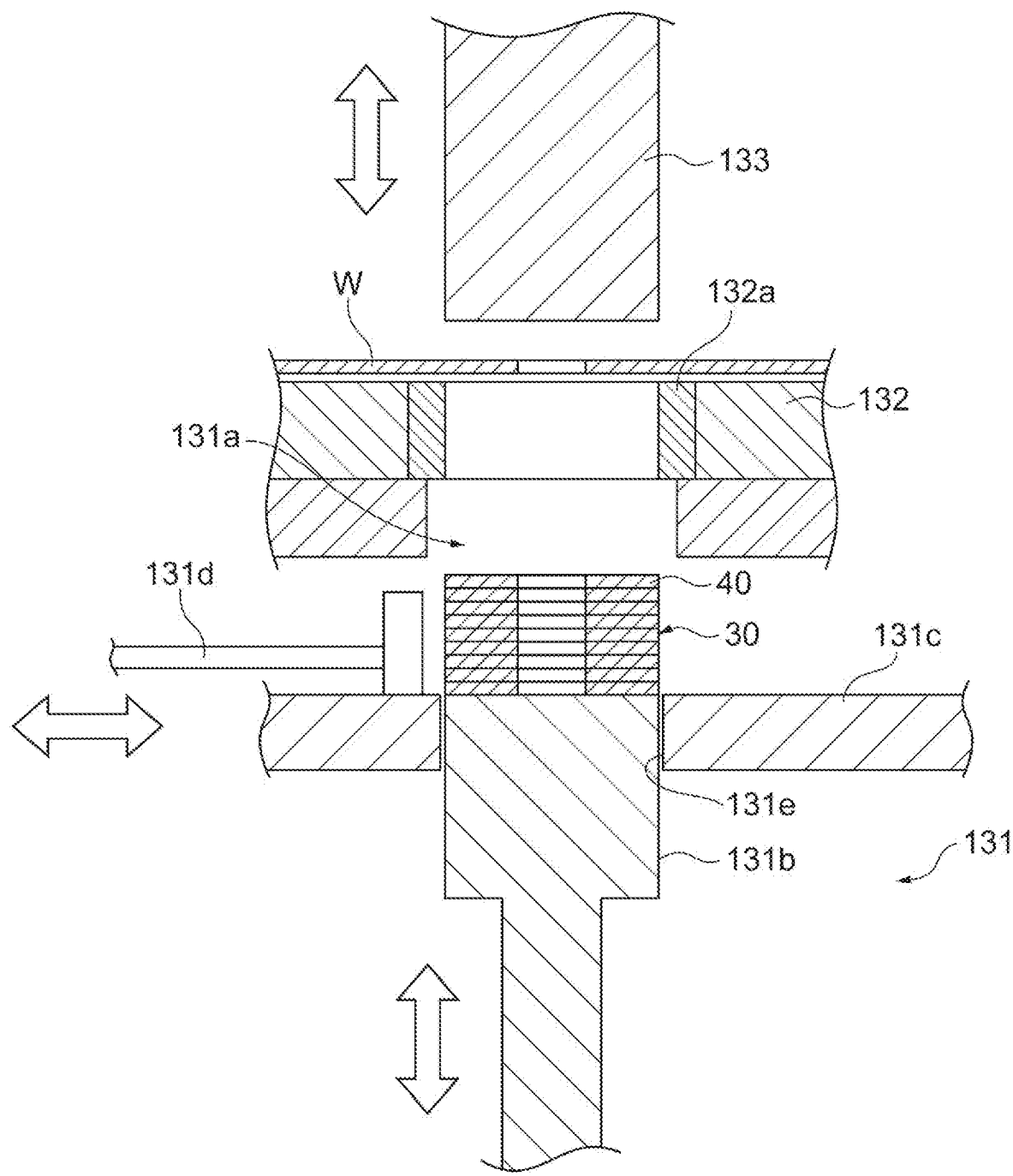
FIG. 7 is a sectional view schematically illustrating the mechanism for stacking the blanked members, and the mechanism for discharging the stack out of the die.

As illustrated in FIG. 6, the punch 133 moves up and down based on an instruction signal from the controller 170. As the punch 133 is inserted into a die 132a held by the die plate 132, the blanked member 40 is blanked out of the electrical steel sheet W. At this time, the cylinder 131b supports the blanked member 40 in a reciprocal manner, to prevent the blanked member 40 blanked by the punch 133 out of the electrical steel sheet W from falling.

The cylinder 131b is configured to be movable upward or downward based on an instruction signal from the controller 170. Therefore, every time a blanked member 40 is stacked on the cylinder 131b, the cylinder 131b is moved down, intermittently. When a predetermined number of blanked members 40 are stacked on the cylinder 131b and the stack 30 is formed, the cylinder 131b is moved to the position where the surface of the cylinder 131b comes to the same level as the surface of the stage 131c, as illustrated in FIG. 7.

The stage 131c has a hole 131e through which the cylinder 131b can pass. The pusher 131d is configured to be movable in horizontal directions along the surface of the stage 131c, based on an instruction signal from the controller 170. With the cylinder 131b moved to the position at which the surface of the cylinder 131b is at the same level as the surface of the stage 131c, the pusher 131d dispenses the stack 30 on the cylinder 131b onto the stage 131c. The stack 30 dispensed onto the stage 131c is discharged onto a conveyor Cv1 that extends between the blanking device 130 and the annealing furnace 140. The conveyor Cv1 may be configured to send the stack 30 to the annealing furnace 140 in response to an instruction from the controller 170.

The annealing furnace 140 may be configured to evaporate or otherwise remove the oil applied on the blanked members 40, and to relieve strain remaining in the blanked members 40, by heating the stack 30 at a predetermined temperature (e.g., approximately 750° C. to 800° C.) over a predetermined time length (e.g., approximately 1 hour). The stack 30 discharged from the annealing furnace 140 is placed on a conveyor Cv2 which extends between the annealing furnace 140 and the temporarily-connecting tab removing device 150. The conveyor Cv2 may be configured to send the stack 30 to the temporarily-connecting tab removing device 150 in response to an instruction from the controller 170.

The temporarily-connecting tab removing device 150 has a function for removing the temporarily-connecting tab portions 31 from the stack 30 sent by the conveyor Cv2. Once the temporarily-connecting tab removing device 150 removes the temporarily-connecting tab portions 31 from the stack 30, a temporary stack 50 is obtained. In some examples, the temporary stack 50 may comprise a plurality of workpieces 10 stacked on top of each other, with the adjacent workpieces 10 are not joined together (see FIG. 8). The temporary stack 50 discharged from the temporarily-connecting tab removing device 150 is placed on a conveyor Cv3 which extends between the temporarily-connecting tab removing device 150 and the stacking device 160. The conveyor Cv3 may be configured to send the temporary stack 50 to the stacking device 160 in response to an instruction from the controller 170.

Figure 8:
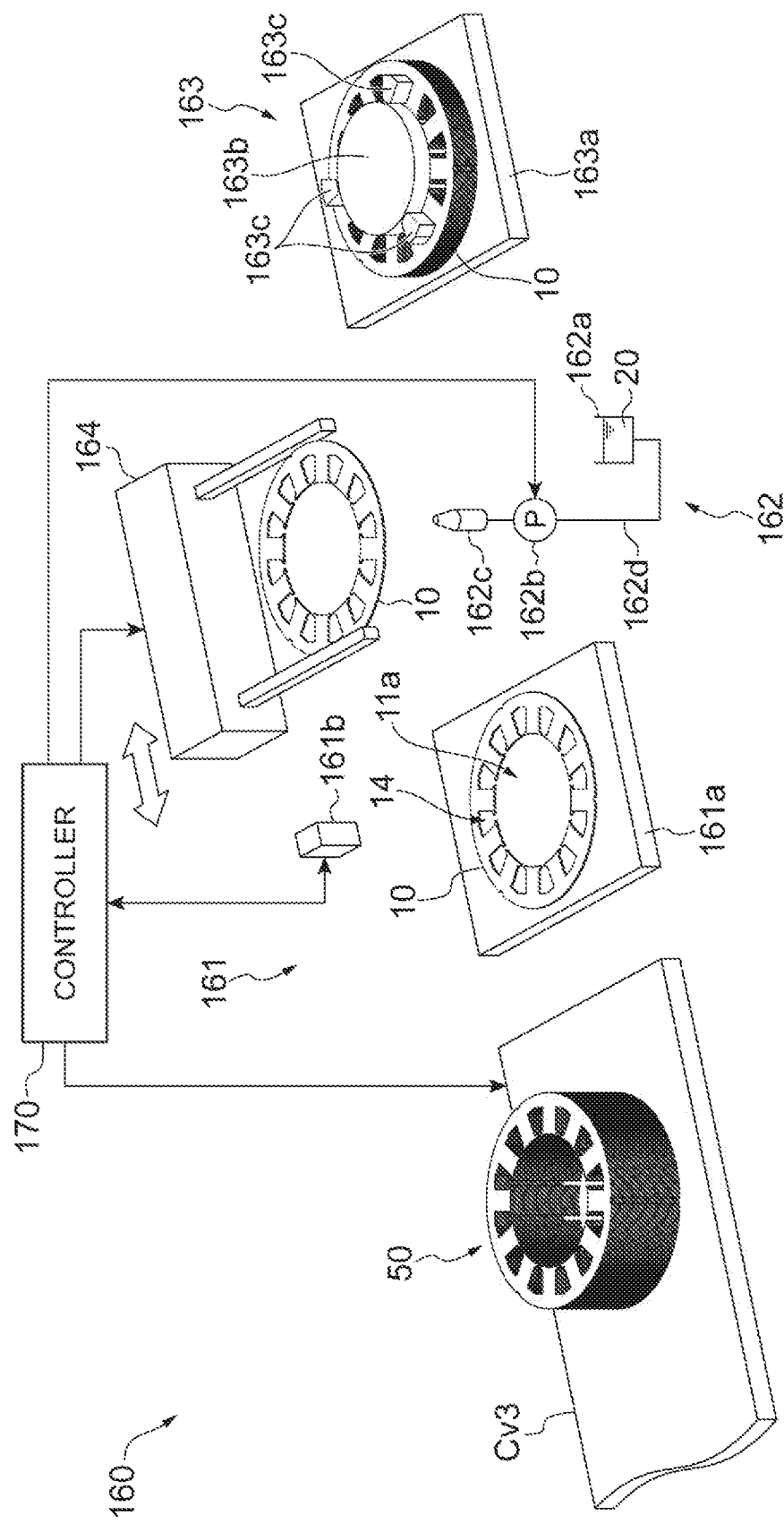
FIG. 8 is a schematic illustrating an example stacking device.

The stacking device 160 may be configured to take one workpiece 10 at a time from the temporary stack 50 fed by the conveyor Cv3, to supply the adhesive 20 to the workpiece 10, and to stack the workpiece 10 supplied with the adhesive 20 on top of another workpiece 10. The stacking device 160 includes, as illustrated in FIG. 8, a measuring unit 161 (measuring mechanism), a supplying unit 162 (supplying mechanism), a stacking jig 163 (jig), and a robot hand 164 (holding mechanism).

The measuring unit 161 includes a placing table 161a and a measurement instrument 161b. The measurement instrument 161b may be configured to measure the thickness of one workpiece 10 placed on the placing table 161a in response to an instruction from the controller 170. Additionally, the measurement instrument 161b may be configured to measure the thickness of the yoke piece portion 12 of the workpiece 10 at two or more locations. The measurement data measured by the measurement instrument 161b is transmitted to the controller 170. The measurement instrument 161b may be a contact measurement instrument, or a non-contact measurement instrument (e.g., a laser measurement instrument or an image-capturing camera). When the measurement instrument 161b is an image-capturing camera that captures an image of the workpiece 10, the controller 170 executes image processing of the captured image to calculate the thickness of the workpiece 10.

The supplying unit 162 includes a liquid source 162a, a pump 162b, a supply nozzle 162c, and piping 162d. The piping 162d connects the liquid source 162a, the pump 162b, and the supply nozzle 162c in this order, from the upstream side to the downstream side. The liquid source 162a functions as a supply source of the adhesive 20. Acrylic or epoxy-based adhesive may be used as the adhesive 20, for example. The adhesive 20 may be one-part adhesive or two-part adhesive. The pump 162b may be configured to suck or otherwise withdraw the adhesive 20 from the liquid source 162a, in response to an instruction from the controller 170, and to send the adhesive 20 into the supply nozzle 162c via the piping 162d.

The supply nozzle 162c is provided in such a manner that the outlet faces upwards. Therefore, the adhesive 20 reaching the outlet of the supply nozzle 162c is supplied to the lower surface of the workpiece 10. If the pump 162b operates by the controller 170 in this state, the adhesive 20 is supplied to predetermined locations of the lower surface of the workpiece 10. The adhesive 20 may be supplied as a spot, or may be applied to some extent, on the lower surface of the workpiece 10. The adhesive 20 may be supplied to the lower surface of the workpiece 10 in such an amount that the adhesive 20 does not come out between the workpieces 10, due to the pressure applied thereto when the workpieces 10 are stacked to each other.

The supply nozzle 162c may have a number of outlets corresponding to the number of the regions to which the adhesive 20a, 20b is to be supplied, on the yoke piece portion 12 and the teeth piece portions 13 of the workpiece 10. In some examples, the outlets may be aligned radially from the central axis Ax of the workpiece 10. The areas of the openings of the outlets arranged in the radial direction with respect to the central axis Ax may increase from the central axis Ax toward the outer side, may be substantially equal, or may decrease from the central axis Ax toward the outer side. When the adhesive 20 is supplied to the outlets sequentially from the side of the central axis Ax toward the outer side, because the adhesive 20 is usually highly viscous, the amount of the adhesive 20 ejected from the outlet may become smaller on the downstream side. When the areas of the openings of the outlets that are aligned in the radial direction of the central axis Ax are sequentially increased from the central axis Ax toward the outer side, the amount of adhesive 20 discharged by each of the outlets may be made uniform to retain, the adhesive 20 between the workpieces 10 when the workpieces 10 are stacked, and maintain an even supply or an even distribution of the adhesive 20. In some examples, the outlet positioned on the more downstream side of the path of the adhesive 20 may be provided with a larger area.

The stacking jig 163 includes a pedestal 163a, an insertion post 163b, and a plurality of insertion pins 163c. The pedestal 163a is a plate-shaped body having a substantially rectangle shape. The insertion post 163b and the insertion pins 163c are provided on the pedestal 163a in a manner protruding upwards from the upper surface of the pedestal 163a. The positions of the insertion post 163b and the insertion pins 163c correspond to the positions of the through-hole 11a and the slots 14 of the workpiece 10, respectively. The insertion post 163b has a cylindrical shape, and has an external shape corresponding to the through-hole 11a of the workpiece 10. The insertion pins 163c are positioned on the outer side of the insertion post 163b, in a manner surrounding the insertion post 163b. Each of the insertion pins 163c has a polygonal-prism-like shape, and has an external shape corresponding to the shape of the slot 14 of the workpiece 10. In some examples, the number of the insertion pins 163c is three, but the number of the insertion pins 163c may be at least one, and may be less than the number of slots 14 provided to the workpiece 10.

The robot hand 164 may be configured to operate based on an instruction signal from the controller 170. The robot hand 164 is enabled to hold and to convey one of the workpieces 10 included in the temporary stack 50. In some examples, the robot hand 164 may be configured to hold one of the workpieces 10 from the temporary stack 50 fed by the conveyor Cv3, and to place the workpiece 10 on the placing table 161a. The robot hand 164 may hold one of the workpieces 10 placed on the placing table 161a, and position the workpiece 10 above the supply nozzle 162c in such a manner that the lower surface of the workpiece 10 faces the outlet of the supply nozzle 162c. Additionally, the robot hand 164 may be configured to set the workpiece 10 on the stacking jig 163, from the position where the one workpiece 10 is held above the supply nozzle 162c, while inserting the insertion post 163b into the through-hole 11a of the workpiece 10, and to insert the insertion pins 163c into the corresponding slots 14 provided to the workpiece 10, respectively. If there is another workpiece 10 having already been set on the stacking jig 163 when the one workpiece 10 is to be set on the stacking jig 163, the one workpiece 10 is stacked on top of the other workpiece 10.

Figure 9:
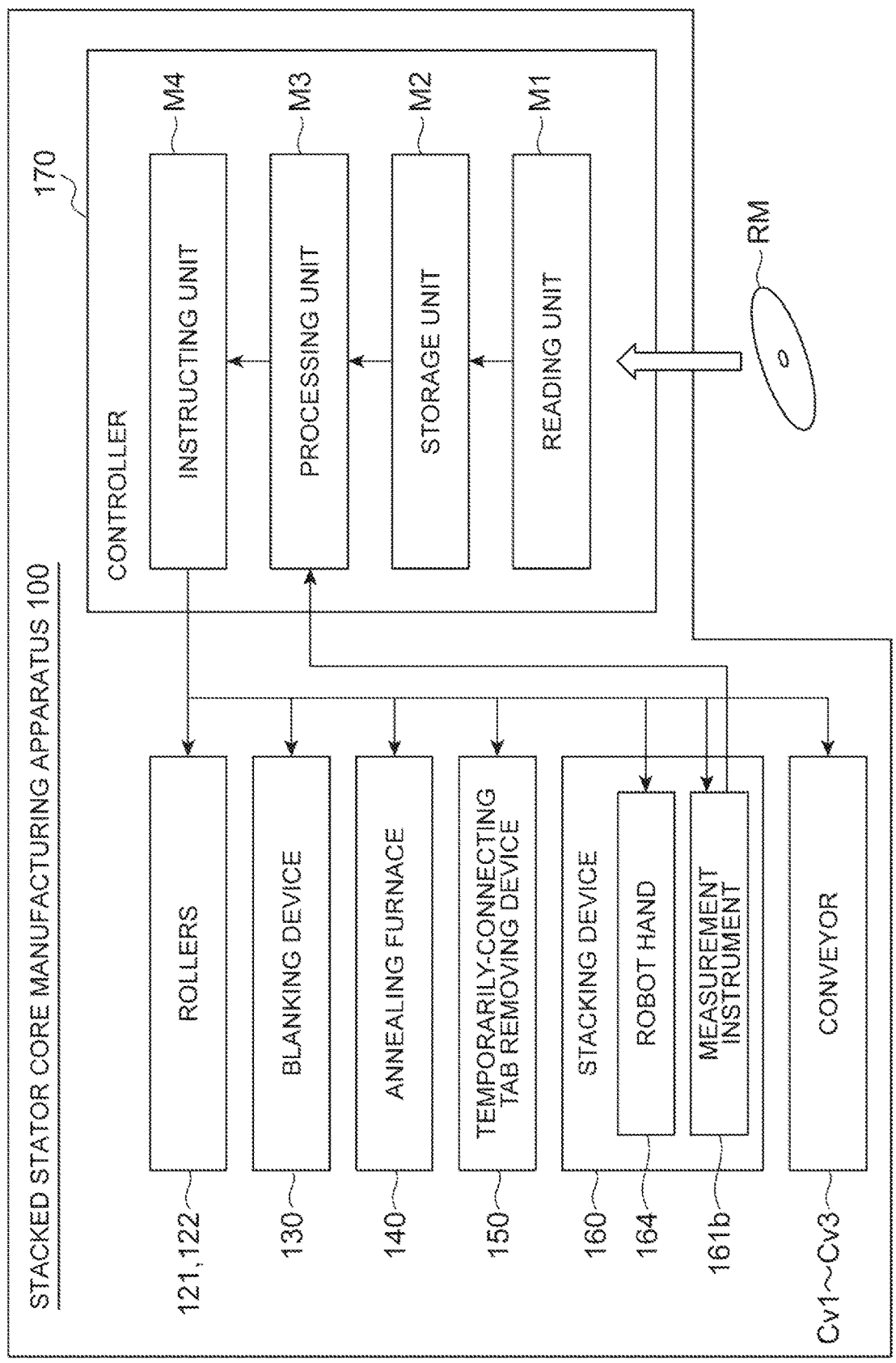
FIG. 9 is a block diagram illustrating an example apparatus for manufacturing a stacked stator core.
Figure 10:
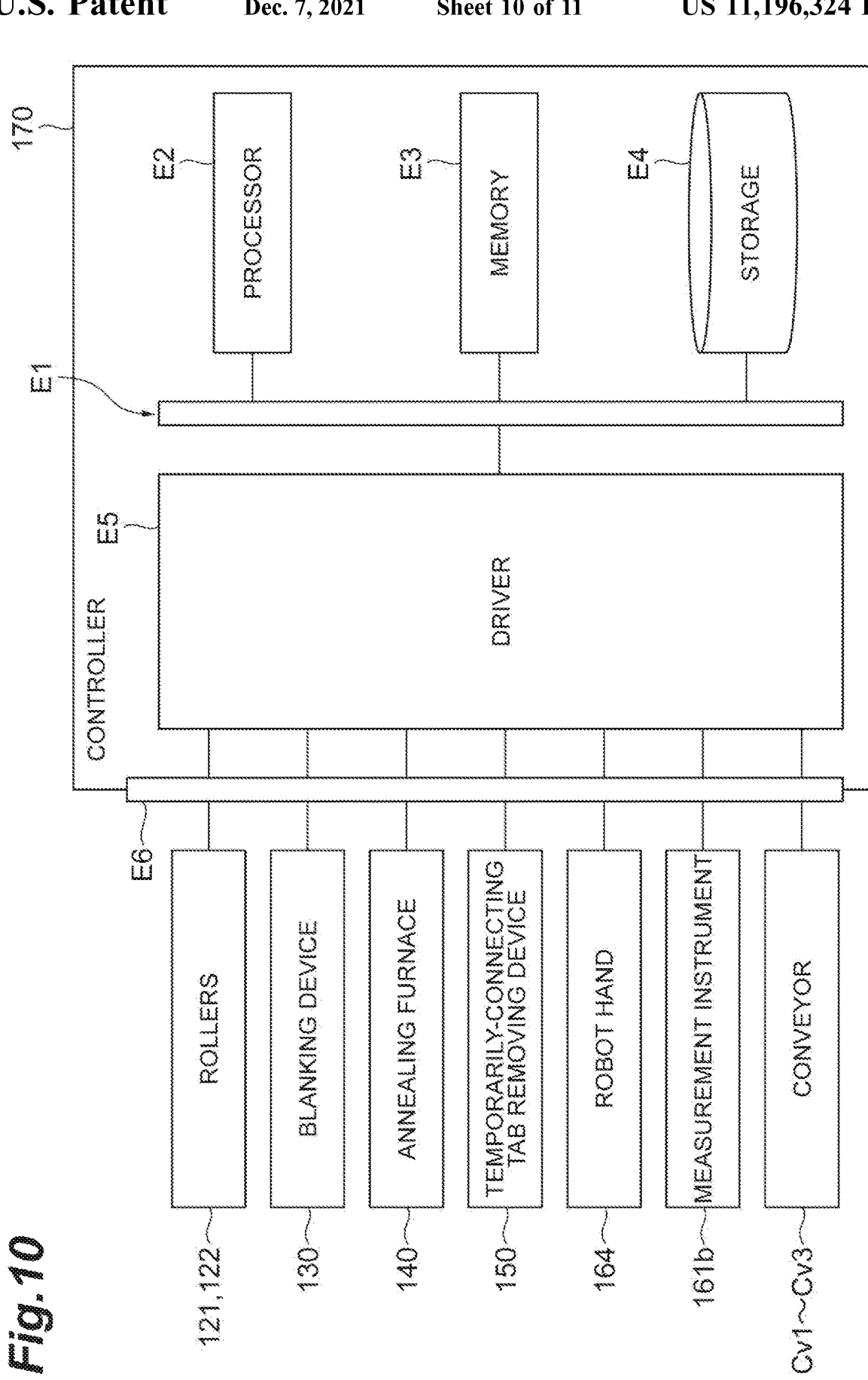
FIG. 10 is a general schematic illustrating an example hardware configuration of a controller.

The controller 170 may be configured to control the apparatus 100 partially or entirely. The controller 170 includes, as illustrated in FIG. 9, a reading unit M1 (e.g., reading apparatus), a storage unit M2 (e.g., storage apparatus), a processing unit M3 (e.g., processing apparatus), and an instructing unit M4 (e.g., instructing apparatus). In some examples, one or more of the controller units may comprise functional modules. These units or functional modules may comprise functional partitions of the controller 170. For example, the controller functionality may be partitioned into a plurality of modules for convenience, without partitioning the hardware making up the controller 170 into such modules. The implementation of the functional modules may be obtained by execution of a computer program. In other examples, implementation of the functional modules may be achieved by a dedicated electric circuit (e.g., logic circuit), or an integrated circuit (application-specific integrated circuit (ASIC)) that is an integration of such electric circuits. In still further examples, one or more of the controller units may comprise separate apparatuses.

The reading unit M1 reads a computer program from a computer-readable recording medium RM. The recording medium RM records a computer program for causing the apparatus 100 to perform various operations. The recording medium RM may be a semiconductor memory, an optical recording disc, a magnetic recording disk, or a magneto-optical recording disc, for example.

The storage unit M2 stores various types of data. The storage unit M2 stores settings and other data entered by an operator via an external input device, for example, as well as the computer program read by the reading unit M1.

The processing unit M3 processes various types of data. The processing unit M3 generates a signal for operating the rollers 121, 122, the blanking device 130, the annealing furnace 140, the temporarily-connecting tab removing device 150, the measurement instrument 161b, the robot hand 164, or the conveyors Cv1 to Cv3, based on various types of data stored in the storage unit M2, for example. The processing unit M3 determines whether the rotational stacking is to be used for the workpiece 10 corresponding to the measurement data, based on the measurement data received from the measurement instrument 161b. If the determination result is that the rotational stacking is to be used, the processing unit M3 generates an instruction signal for stacking the workpiece 10 rotationally.

The instructing unit M4 transmits the signal generated by the processing unit M3 to the rollers 121, 122, the blanking device 130, the annealing furnace 140, the temporarily-connecting tab removing device 150, the measurement instrument 161b, the robot hand 164, or the conveyors Cv1 to Cv3.

The hardware of the controller 170 may be configured as one or more controlling computers, for example. The controller 170 may include a circuit E1 illustrated in FIG. 10, for example, as a hardware element. The circuit E1 may be configured as an electric circuit device (circuitry). In some examples, the circuit E1 includes a processor E2, a memory E3, a storage E4, a driver E5, and an input/output port E6. The processor E2 may provide the functional modules described above by executing a computer program in cooperation with at least one of the memory E3 and the storage E4, and outputting/inputting the signals via the input/output port E6. The driver E5 is a circuit that drives various devices included in the apparatus 100. The input/output port E6 inputs and outputs signals to and from the driver E5 and the various devices included in the apparatus 100.

In some examples, the apparatus 100 is provided with one controller 170, but in other examples the apparatus 100 may be provided with a controller group (control unit) including a plurality of controllers 170. When the apparatus 100 is provided with a controller group, each of the functional modules described above may be implemented by a corresponding one of the controllers 170, or by a combination of two or more of the controllers 170. When the controller 170 is implemented by a plurality of computers (e.g., the circuits E1), each of the functional modules described above may be implemented by a corresponding one of the computers, or by a combination of two or more of the computers. The controller 170 may include a plurality of processors E2. In such a case, each of the functional modules may be implemented by a corresponding one of the processors E2, or by a combination of two or more of the processors E2.

Method of Manufacturing Stacked Stator Core

Figure 11:
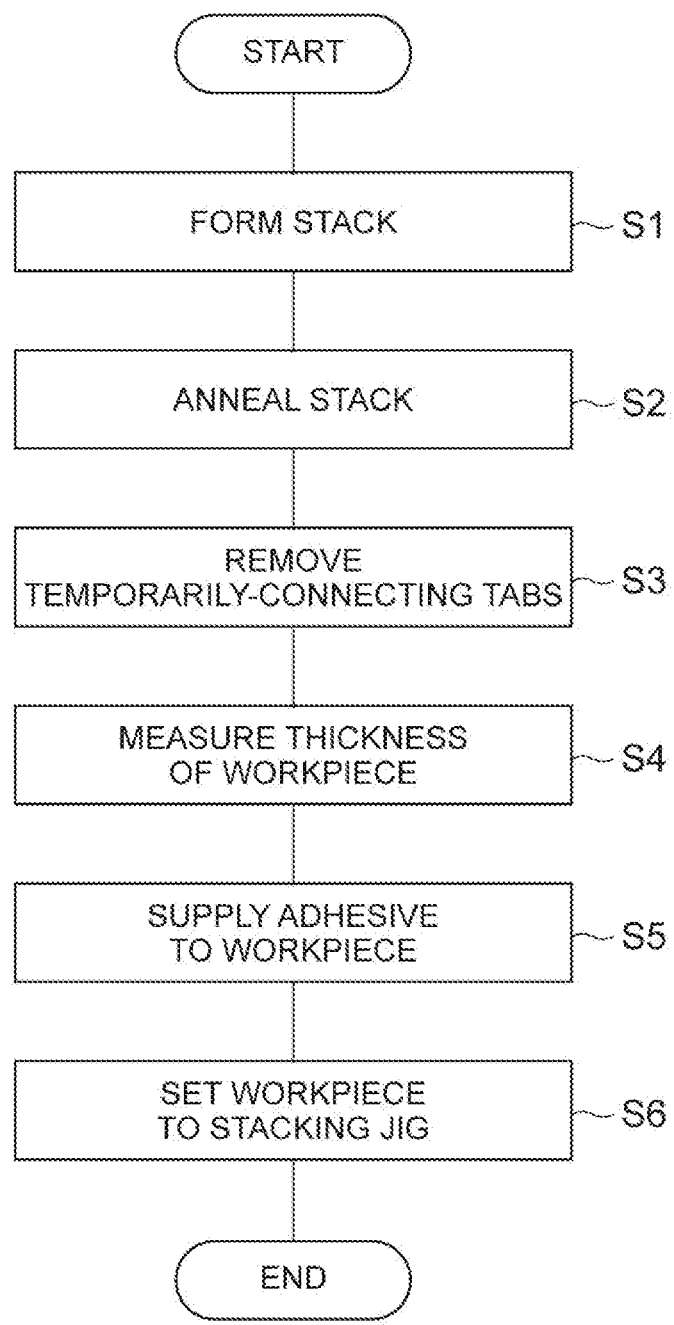
FIG. 11 is a flowchart for explaining an example method of manufacturing a stacked stator core.

FIG. 11 illustrates an example method for manufacturing the stacked stator core 1.

At Step S1 of FIG. 11, the stack 30 is formed, which may include a temporary stacking step and/or a temporary stacking process. In some examples, based on an instruction of the controller 170, the feeder 120 feeds the electrical steel sheet W to the blanking device 130, and the blanking device 130 blanks a portion to be worked in the electrical steel sheet W, into a predetermined shape. As a result of this process, the blanked member 40 is formed. By repeating this blanking process, a predetermined number of blanked members 40 are stacked while being fastened to one another via the temporarily-connecting tabs 42, and one stack 30 is manufactured. At this point in time, the oil is applied on the blanked members 40 forming the stack 30.

The conveyor Cv1 then conveys the stack 30 discharged from the blanking device 130 to the annealing furnace 140, based on an instruction of the controller 170. At Step S2 of FIG. 11, the annealing furnace 140 anneals the stack 30 based on an instruction of the controller 170, which may include an oil removing step and/or an oil removing process. As a result, the oil applied on the blanked members 40 forming the stack 30 is removed. The conveyor Cv2 then conveys the stack 30 having been annealed and discharged from the annealing furnace 140 to the temporarily-connecting tab removing device 150, based on an instruction of the controller 170.

At Step S3 of FIG. 11, the temporarily-connecting tab removing device 150 then removes the temporarily-connecting tab portions 31 from the stack 30 based on an instruction of the controller 170, which may include a separating step and/or a separating process. The temporarily-connecting tab removing device 150 fixes a part of the stack 30, for example the part being a part that is to form the stacked stator core 1, and applies a force to the temporarily-connecting tab portions 31 in the stacking direction with a piston or the like. As a result, the temporarily-connecting tab portions 31 are removed from the stack 30, and the temporary stack 50 is formed, in which the workpieces 10 are stacked without the adjacent workpieces being fastened to one another. The conveyor Cv3 then conveys the temporary stack 50 discharged from the temporarily-connecting tab removing device 150 to the stacking device 160 based on an instruction of the controller 170.

The robot hand 164 then holds one of the workpieces 10 from the temporary stack 50, and to place the workpiece 10 on the placing table 161a, based on an instruction of the controller 170. At Step S4 of FIG. 11, the measurement instrument 161b then measures the thickness of the workpiece 10 on the placing table 161a based on an instruction of the controller 170. The measurement instrument 161b may measure the thickness of the yoke piece portion 12 at three locations, in a manner corresponding to the number of temporarily-connecting tabs, for example. Such locations that are the targets of the measurements may be set at an interval of 120° about the central axis Ax. As a result, the thicknesses at three locations of the yoke piece portion 12 are obtained. In some examples, the number of locations to be measured may be two or more. The positions to be measured may be provided at an equal interval about the central axis Ax, or may be provided at a predetermined interval. Once the measurements of the thicknesses of the workpiece 10 are completed, the measurement instrument 161b transmits the measurement data to the controller 170.

Upon receiving the measurement data of the workpiece 10 from the measurement instrument 161b, the controller 170 determines whether the rotational stacking is to be used for the workpiece 10. In some examples, the controller 170 initially calculates thickness difference of the workpiece 10. If the calculated thickness difference is equal to or smaller than a predetermined threshold, the controller 170 determines that the rotational stacking is not to be used for the workpiece 10. If the calculated thickness difference is more than the predetermined threshold, the controller 170 determines that the rotational stacking is required for the workpiece 10, and calculates the angle most suitable for cancelling out the thickness difference with respect to the assembly of the workpieces 10 which have set on the stacking jig 163. The controller 170 may be configured not to determine whether the rotational stacking is to be used for the workpiece 10, or to omit the determination, when the workpiece 10 is the first one set on the stacking jig 163.

The robot hand 164 then holds the workpiece 10 on the placing table 161a, and to position the workpiece 10 above the supply nozzle 162c in such a manner that the lower surface of the workpiece 10 faces the outlet of the supply nozzle 162c, based on an instruction of the controller 170. At Step S5 of FIG. 11, the robot hand 164 and the pump 162b then operate synchronously based on an instruction of the controller 170. When the location of the lower surface of the workpiece 10 to be supplied with the adhesive 20 approaches the outlet of the supply nozzle 162c, the supply nozzle 162c supplies the adhesive 20 to the location to be supplied, in a spot-like shape, for example. Step S5 may include a finalizing stacking step and/or a finalizing stacking process. When the workpiece 10 is the first workpiece set on the stacking jig 163, this supplying of the adhesive 20 to the workpiece 10 may be omitted (e.g., Step S5 may be omitted).

The robot hand 164 then conveys the workpiece 10 from the supplying unit 162 onto the stacking jig 163, based on an instruction of the controller 170. At Step S6 of FIG. 11, if it has been determined not to use the rotational stacking for the workpiece 10, as a result of determining whether the rotational stacking is to be used at Step S4, the robot hand 164 sets the workpiece 10 to the stacking jig 163 without rotating the workpiece 10. Step S6 may comprise a finalizing stacking step and/or a finalizing stacking process. If it has instead been determined to use the rotational stacking for the workpiece 10, as a result of determining whether the rotational stacking is to be used at Step S4, the robot hand 164 rotates the workpiece 10 by the calculated angle, and then sets the workpiece 10 to the stacking jig 163 at Step S6. When the workpiece 10 is set to the stacking jig 163, the insertion post 163b is inserted into the through-hole 11a of the workpiece 10, and the insertion pins 163c are passed through the corresponding slots 14 of the workpiece 10, respectively.

By repeating the processes at Steps S4 to S6 for each of the workpieces 10 included in the temporary stack 50, the workpieces 10 are stacked one after another on the stacking jig 163. As a result, the stacked stator core 1 in which the workpieces 10 are stacked, and in which the adjacent workpieces 10 are joined to each other with the adhesive is obtained.

In some examples, after the stack 30 is formed by the blanking device 130, the oil may be removed from the stack 30, the blanked members 40 may be bonded, and the rotational stacking may be performed outside of the blanking device 130. Therefore, the mechanism for removing the oil, the mechanism for supplying the adhesive, and the mechanism for rotating the workpiece 10 may not be included inside the blanking device 130, and the size of the blanking device 130 can be reduced. As a result, when the blanking device 130 is what is called a "multi-row" blanking device in which the blanked members 40 are formed in a plurality of rows as a set from the electrical steel sheet W, or when the blanking device 130 is a "common" blanking device 130 that uses the same electrical steel sheet W to form the blanked members 40 for manufacturing the stacked stator core 1 and those for manufacturing the stacked rotor core, an increase in the size of the blanking device 130 may be avoided.

When an anaerobic adhesive is used in a section inside the die where the adhesive is sealed from the air, metal ion binding takes place and the adhesive adheres to the die, which can create a contaminant. When a thermosetting adhesive is used, a heater may be inside the die, however the size of the die is increased. Furthermore, when a two-part adhesive is used, the application mechanism or the piping provided may be used inside of the die, because two types of liquid are introduced inside of the die. Therefore, usable types of adhesive may become limited. By contrast, in some examples, the supplying unit 162 for supplying the adhesive 20 is provided outside of the blanking device 130 (outside of the die). Therefore, an anaerobic adhesive 20 can be used when there is no metallic member arranged nearby. Furthermore, a thermosetting or two-part adhesive 20 may be used, without no installation-related limitation imposed upon the die. Therefore, fewer constraints may be imposed on the selection of the adhesive 20 to provide greater flexibility in manufacturing options and designs.

In some examples, the stacked stator core 1 is achieved by stacking the workpieces 10 while bonding the adjacent workpieces to each other with the adhesive 20. Therefore, magnetic characteristics are less likely to deteriorate compared with when the workpieces 10 are fastened using the connecting tabs or welding, and motor characteristics can be improved by manufacturing a motor using such a stacked stator core 1. When a thin electrical steel sheet W is selected (e.g., approximately 0.2 millimeter to 0.25 millimeter, or thinner), the workpiece obtained from such a thin electrical steel sheet W may tend to deform. On the other hand, example workpieces 10 may be joined only with an adhesive enabling the stacked stator core 1 to be manufactured efficiently at a low cost.

The process of removing the oil and the process of supplying the adhesive 20 may take place at a relatively slower speed than the process of forming the blanked member 40 by blanking the electrical steel sheet W in the blanking device 130. However, in some examples, the annealing furnace 140 and the supplying unit 162 are provided outside of the blanking device 130. Therefore, by providing the annealing furnace 140 and the supplying unit 162 independently from the blanking device 130, the overall throughput can increase by allowing the blanking device 130 to perform the process of forming the blanked member 40 at a higher speed. In addition, because the annealing furnace 140 and the supplying unit 162 are generally less expensive than the blanking device 130, a cost reduction can be achieved, compared with when the overall throughput is to increase by using a plurality of blanking devices 130. Accordingly, the stacked stator core 1 can be manufactured efficiently at a low cost.

In some examples, the stack 30 is formed in the blanking device 130, and the oil on the stack 30 is removed in the annealing furnace 140. Therefore, an adhesion of the workpieces 10 due to the surface tension of the oil may be reduced, avoided or suppressed, so that each of the workpieces 10 may be more readily extracted from the temporary stack 50 in the subsequent process. Furthermore, because the oil is removed from the entire stack 30, the oil can be removed more efficiently compared with when the oil is separately removed from each one of the workpieces 10. Moreover, by removing the oil from the stack 30, there is less effect on the adhesion performance of the adhesive 20.

When the blanked member 40 is formed by blanking the electrical steel sheet W in the blanking device 130, strain is generated in the blanked member 40 in the process of blanking a peripheral part of the blanked member from the electrical steel sheet W. If a motor is manufactured using a stacked stator core 1 obtained by such deformed blanked members 40, the motor characteristics may be affected thereby. However, in some examples, because the oil applied on the stack 30 is removed by annealing the stack 30, the deformation of the blanked member 40 is relieved at the same time as the oil is removed. Hence, the stacked stator core 1 can be manufactured more efficiently in contrast to methods in which a metal plate with the adhesive applied is blanked, and stacked on another blanked member while the blanked members adhere to each other with the adhesive.

If the resultant stack is to be annealed, the adhesive will also be exposed to the high-temperature (e.g., approximately 750° C. to 800° C.) for a long time (e.g., approximately 1 hour). Conventional adhesives may not be tolerant against the annealing temperature if the blanked members cannot be sufficiently annealed, strain may be generated in the blanked members, and the motor characteristics may deteriorate.

However, in some examples, the supplying unit 162 for supplying the adhesive 20 is provided outside of the blanking device 130 (outside of the die), and the adhesive is supplied to the workpieces 10 after the stack 30 is annealed. Therefore, limitations imposed on the selection of the adhesive 20 may be reduced.

The controller 170 may be configured to determine whether the rotational stacking is to be used for the workpiece 10 based on the thickness of the workpiece 10 measured by the measurement instrument 161b. Therefore, the controller 170 makes the determination as to whether the rotational stacking is to be used for each one of the workpieces 10. Hence, the flexibility of the rotational stacking is increased, so that the dimensional precision of the final stacked stator core 1 can be improved.

In some examples, the stack 30 is obtained by stacking the blanked members 40 while fastening the blanked members 40 to each other with the temporarily-connecting tab 42. Therefore, a plurality of blanked members 40 can be handled integrally as one stack 30 during the annealing process in the annealing furnace 140. Furthermore, the temporarily-connecting tab portions 31 may be removed from the stack 30 after the annealing process of the stack 30. Therefore, the stacked stator core 1 that is the final product does not have the temporarily-connecting tabs 42, and the workpieces 10 are bonded together with the adhesive. Hence, the stacked stator core 1 can be readily handled during the production process.

In some examples, the workpieces 10 are stacked on the stacking jig 163 sequentially in such a manner that the insertion post 163b is inserted into the through-hole 11a provided to the workpiece 10, and so that the insertion pins 163c are inserted into the corresponding slots 14 on the workpiece 10, respectively. Therefore, the workpieces 10 are aligned with respect to a predetermined position, at the same time as the workpieces 10 are stacked. Furthermore, if some blanking scrap gets inside of the slot 14, the insertion pin 163c pushes the blanking scrap out, as the insertion pin 163c is inserted into the slot 14. Hence, a separate inspection (such as a "gauge insertion inspection") may not be used to check whether any misalignment has occurred along the surfaces of the blanked members 40 at the time of stacking the workpiece 10. Additionally, a separate inspection may not be used to check whether there is any blanking scrap remaining inside the slot 14, after the stack of the workpieces 10 is completed. As a result, the stacked stator core 1 can be efficiently manufactured.

When the electrical steel sheet W is blanked with the punch 133, as illustrated in FIG. 6, the electrical steel sheet W may become stretched between the punch 133 and the die 132a in the process of blanking, and the size of the blanked member 40 blanked out of the electrical steel sheet W may become larger than the die 132a. Therefore, when the punch 133 is moved upwards, the blanked member 40 may become bent in a manner protruding upwards inside of the die 132a.

If the blanked members 40 are to be bonded inside the die 132a using adhesive, a large amount of adhesive may be used in order to bond the blanked members 40 together against a deformation in the blanked members 40. A thick-film like adhesive layer may then be interposed between the blanked members 40, and the flatness or the space factor of the stacked stator core 1 obtained as the final product may be impaired. The space factor is the ratio occupied by the workpiece 10 with respect to the volume of the entire stacked stator core 1, and this ratio goes down as a larger amount of adhesive 20 is used.

However, in some examples, because one workpiece 10 is taken out and stacked at a time from the temporary stack 50 discharged from the blanking device 130, the workpiece 10 is not restrained by the die 132a. Therefore, the amount of adhesive 20 for bonding the workpieces 10 together can be reduced, and the flatness or the space factor of the stacked stator core 1 that is obtained as the final product can be improved. Moreover, the parallelism and the perpendicularity of the stacked stator core 1 are improved, so that the interference with the stacked rotor core placed inside of the through-hole 1a of the stacked stator core 1 can be suppressed, and the stacked stator core 1 and the stacked rotor core can be assembled more easily.

In some methods, a metal plate with the adhesive applied is blanked, and stacked on another blanked member by allowing the two to be bonded to each other with the adhesive. Therefore, if the operation of the apparatus stops for some reason while the blanked members are being stacked, the adhesive becomes solidified as the time elapses, and a new blanked member may not be bonded to the incomplete stack of the blanked members. Hence, the incomplete stack of the blanked members is discarded entirely.

However, in some examples, because the adhesive 20 is supplied to each one of the workpieces 10, even if the operation of the apparatus 100 stops for some reason and the adhesive 20 becomes solidified, only the one workpiece 10 is discarded. Therefore, a reduction of the cost of materials and an improvement of the yield is achieved while suppressing manufacture of defective stacked stator cores.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

For example, at Step S2 of FIG. 11, the oil may be removed from the stack 30 using a technique other than annealing. For example, the stack 30 may be heated (e.g., burned off in a burn-off furnace, or brewed in a brewing furnace) within a temperature less than the annealing temperature (e.g., approximately 100° C. to 550° C.), for a length of time less than the annealing time (e.g., approximately 30 minutes to 1 hour). Alternatively, the stack 30 may be impregnated with a solvent (e.g., acetone), or the oil applied on the stack 30 may be blown off with air. Moreover, the oil may be removed from the stack 30 by leaving the stack 30 in a normal-temperature environment for a predetermined length of time (e.g., one day), and allowing the oil to naturally dry.

A process for checking whether there is any defect (e.g., scratch, dint, dent, blanking scrap) on the workpiece 10 may be performed after Step S3 and before Step S4 of FIG. 11. For example, a defect on the workpiece 10 may be detected, after the robot hand 164 holds one of the workpieces 10 from the temporary stack 50, by capturing an image of the workpiece 10 using an image capturing device (e.g., camera), and image processing to the captured image by the controller 170. If a defect is detected on the workpiece 10, the workpiece 10 may be discarded. Furthermore, if the defect on the workpiece 10 is a blanking scrap remaining on the workpiece 10, the blanking scrap may be removed using an air blower. On the other hand, a method which produces a stack which is discharged from the die and in which the individual blanked members are bonded and stacked with one another prohibits checking whether any one of the blanked members has any defect.

A process for checking the shape or the size of the workpiece 10 may be performed after Step S3 and before Step S4. For example, a determination as to whether the workpiece 10 has a shape or a size that is in accordance with its design may be made by capturing an image of the workpiece 10 using an image capturing device (e.g., a camera), and image processing the captured image by the controller 170. In some examples, the determination may be made after the robot hand 164 holds one of the workpieces 10 from the temporary stack 50. The shape or the size to be checked may be limited to a significant part of the workpiece 10. On the other hand, a method which produces a stack which is discharged from the die and in which the individual blanked members are bonded and stacked with one another prohibits checking the shape or the size of each of the blanked members.

Two coil members 111 may be joined by welding their ends before use. In some examples, if the welded part of the coil members 111 is blanked by the punch 133, the blanked member 40 including such a welded part will be included in the stack 30. If a motor is manufactured using a stacked stator core 1 obtained from such a stack 30, the motor characteristics may be affected thereby. Therefore, as a first countermeasure, a process for checking whether the workpiece 10 has any welded part may be performed after Step S3 and before Step S4. For example, the presence of a welded part on the workpiece 10 may be determined by capturing an image of the workpiece 10 using an image capturing device (e.g., a camera), and image processing the captured image by the controller 170. In some examples, the presence of the welded part may be determined after the robot hand 164 holds one of the workpieces 10 from the temporary stack 50. If it is determined that the workpiece 10 includes a welded part, the workpiece 10 may be discarded. Alternatively, as a second countermeasure, the welded part may be blanked out in advance using an auxiliary punch having a larger diameter than the punch 133 (the area corresponding to the external shape of the blanked member 40, or an area including the external shape of the blanked member 40 and the pilot hole) on the upstream side of the punch 133, so that the welded part where the coil members 111 are welded is not blanked out by the punch 133. In some examples, even if the area corresponding to the welded part of the electrical steel sheet W arrives at the punch 133, because such an area of the electrical steel sheet W has a through-hole, the punch 133 misses the electrical steel sheet W, so that no blanked member 40 is formed therewith. By selectively discarding the area corresponding to the welded part of the electrical steel sheet W, a loss of the material can be minimized. Therefore, a cost reduction and a yield improvement can both be achieved.

On the other hand, a method which produces a stack which is discharged from the die and in which the individual blanked members are bonded and stacked with one another prohibits checking in advance whether the blanked member has any welded part. Therefore, the entire stack including the blanked member with a welded part needs to be discarded, and the material cost may become increased and the yield may deteriorate.

To improve the adhesion performance, an adhesion aiding agent (such as a curing initiator, a solidification accelerator, or a primer) may be supplied to the workpiece 10 before or after the adhesive 20 is supplied to the workpiece 10 at Step S5. When the adhesion aiding agent is to be supplied before the adhesive 20 is supplied to the workpiece 10, the adhesive 20 may be supplied over the adhesion aiding agent at a step after the adhesion aiding agent is supplied to the workpiece 10. When the adhesion aiding agent is to be supplied after the adhesive 20 is supplied to the workpiece 10, the adhesion aiding agent may be supplied over the adhesive 20, at a step after the adhesive 20 is supplied to the workpiece 10. In some examples, even when the adhesion aiding agent is to be used, a supplying unit for supplying the adhesion aiding agent is provided outside of the blanking device 130 (outside of the die), and the adhesion aiding agent is supplied to the workpiece 10 after the stack 30 is annealed. Therefore, limitations imposed on the selection of the adhesion aiding agent may be reduced. If deterioration of the adhesion performance of the adhesive 20 can be suppressed even with the oil remaining on the workpieces 10, with the use of the adhesion aiding agent, the process of heating the stack 30 such as via annealing (Step S2) may be omitted.

When the adhesion aiding agent is to be supplied after the adhesive 20 is supplied to the workpiece 10, the adhesion aiding agent may be applied or sprayed onto the workpiece 10. In some examples, the adhesion aiding agent may be sprayed from above the workpiece 10, or below the workpiece 10.

The adhesive 20 may be supplied onto the lower surface of the workpiece 10. In other examples, the adhesive 20 may be supplied onto the upper surface of the workpiece 10. In the same manner, the adhesion aiding agent may be supplied onto the lower surface or the upper surface of the workpiece 10.

A process for checking the position and/or the size (diameter) of the adhesion aiding agent or the adhesive 20 may be performed after the adhesion aiding agent or the adhesive 20 is supplied to the workpiece 10. In some examples, an image of the workpiece 10 may be captured using an image capturing device (e.g., a camera), to image process the captured image by the controller 170, and to determine whether the supplied adhesion aiding agent or the adhesive 20 is at a designed position or has a designed size. In some examples, the visibility of the adhesion aiding agent or the adhesive 20 supplied to the workpiece 10 can be improved, by containing a fluorescent substance (e.g., a substance that emits light by reacting to the black light) in the adhesion aiding agent or the adhesive 20. If it is confirmed that the adhesion aiding agent or the adhesive 20 is not at the expected position or does not have the expected size by inspecting the surface supplied with the adhesion aiding agent or the adhesive 20, such a workpiece 10 may be discarded, or the adhesion aiding agent or the adhesive 20 may be supplied again to the workpiece 10. Through the process described above, formations of defective stacked stator cores resulting from the defective application of the adhesion aiding agent or the adhesive 20 may be suppressed. Additionally, the adhesion aiding agent or the adhesive 20 is less likely to come out between the workpieces 10 due to the pressure applied when the workpieces 10 are stacked with one another.

After Step S6, the stacking height of the obtained stacked stator core 1 may be measured, and the measurement result may be used in rotational stacking or stacking when manufacturing next stacked stator core 1. For example, if the stacked stator core 1 does not have the particular stacking height (e.g., a particular stacking number of the workpieces 10), or when the deviation of the stacking height of the stacked stator core 1 exceeds a default value, another workpiece 10 may be added taking the rotational stacking into consideration. As a result, the stacking height or the deviation in the stacking height of the stacked stator core 1 can be readily adjusted, so that the formation of a defective stacked stator core can be suppressed.

The number of the workpieces 10 included in the stacked stator core 1 may be the same as or different from the number of the workpieces 10 stacked in the temporary stack 50 that is discharged from the temporarily-connecting tab removing device 150.

In some examples, one workpiece 10 is taken out at a time from the temporary stack 50, and the one workpiece 10 is supplied with the adhesive 20 and stacked at a time. However, one block, in which a plurality of workpieces 10 are stacked and joined to one another, may be taken out at a time, and the one block may be supplied with the adhesive 20 and be stacked at a time. The workpieces 10 forming the block may be fastened to one another with the temporarily-connecting tab portion 31, may be fastened to one another with a connecting tab provided to the yoke piece portion 12 or the teeth piece portion 13, or may be fastened to one another by welding the outer circumference. If the workpieces 10 forming the block is fastened using a connecting tab or welding, Step S3 may be omitted. After the stacking height of the block is measured at Step S4, a determination whether to use the rotational stacking is made for one block at a time, and the one block is set at a time to the stacking jig 163 at Step S6. At Step S5, the adhesive 20 or the adhesion aiding agent is supplied onto the bottom surface or the top surface of the block.

Additionally, a depression or a projection may be located on the outer circumference of the workpiece 10, and an engaging pin may be engaged with the projection or the depression on the stacking jig 163. The engaging pin protrudes upwards from the top surface of the pedestal 163a. The engaging pin may be used in aligning the workpiece 10, together with the insertion pins 163c. If the stacking jig 163 includes the engaging pin, none of the insertion pins 163c may be included.

In some examples, the stacking jig 163 includes the insertion pins 163c, but the stacking jig 163 may include none of the insertion pins 163c.

In some examples, a stacked rotor core may be manufactured using the method described above.

In some examples, one electrical steel sheet W may be blanked, but in other examples a plurality of electrical steel sheets W may be blanked simultaneously.

Additional Examples

An example method of manufacturing a stacked core may comprise a temporary stacking step for blanking a metal plate along a predetermined shape to form a plurality of core members, each of the plurality of core members being one blanked member or being a block in which a plurality of blanked members are joined together, and for forming a stack by stacking the plurality of core members, inside of a die. Additionally, the example method may comprise a finalizing stacking step for taking out one core member at a time from the stack, and for stacking the plurality of core member while supplying adhesive to each of the plurality of core members in such a manner that the adhesive is placed between the adjacent core members.

After the stack is formed in the die, bonding and stacking of the plurality of core members are carried out outside of the die without a mechanism for supplying the adhesive inside of the die. Hence, the die can be reduced in size. Furthermore, at the finalizing stacking step, the stacked core is obtained by bonding the adjacent core members to each other with the adhesive. Therefore, the magnetic characteristics are less likely to deteriorate compared with when the plurality of core members are fastened to one another via connecting tabs, welding, or the like to improve motor characteristics using such a stacked core.

The method may further include an oil removing step for removing oil applied on the stack taken out from the die, after the temporarily stacking step and before the finalizing stacking step.

The process of removing the oil and the process of supplying the adhesive may take more time than the process of forming a core member by blanking a metal plate in the die. However, by locating mechanisms for removing the oil and mechanisms for supplying the adhesive outside of the die, the entire throughput can be improved by providing each of these mechanisms independently from the die while performing the process of forming the core members in the die at a high speed. Moreover, because these mechanisms are generally less expensive than the die, the cost can be reduced, compared with when the overall throughput is to be improved by using a plurality of dies.

In some examples, at the oil removing step, the oil is removed from the stack having been taken out of the die. Therefore, an adhesion of core members due to the surface tension of the oil may be suppressed. Hence, at the subsequent finalizing laminating step, one core member at a time may be readily removed from the stack. Furthermore, because the oil is removed from the entire stack, the oil can be removed efficiently, compared with when the oil is removed from each of the plurality of core members. Furthermore, because the oil is removed from the stack, the adhesion performance of the adhesive is less affected.

In some examples, at the oil removing step, the oil applied on the stack may be removed by annealing the stack. When the core member is formed by blanking a metal plate in the die, strain is generated in the core member in the process of blanking a peripheral part of the core member from the metal plate. If a motor is manufactured using a stacked core obtained by stacking such deformed core members due to strain, the motor characteristics may be affected. However, the stack may be annealed to relieve strain in the core members which form the stack, Therefore, because relieving strain in the core members and removing the oil occur at the same time, the stacked core can be manufactured more efficiently.

In other methods, a metal plate with the adhesive applied is blanked, and stacked on another core member while allowing the blanked members to adhere to each other with the adhesive. Therefore, if the obtained stack is to be annealed, the adhesive will also be exposed to the high-temperature (e.g., approximately 750 to 800° C.) for a long time (e.g., approximately 1 hour). Conventional adhesives may not be tolerant against the annealing temperature. If the core members cannot be annealed, and therefore, strain in the core members cannot be relieved, a deterioration of the motor characteristics may occur.

In some examples, the finalizing stacking step may include: taking out one core member at a time from the stack having the oil removed at the oil removing step, and measuring a thickness of the core member. Additionally, the method may include determining whether rotational stacking is to be used for each of the plurality of core members, based on the measurement result of the thickness of the core member. The plurality of core members may be stacked based on a result of determining whether the rotational stacking is to be used, while supplying adhesive to each of the plurality of core members in such a manner that the adhesive is placed between the adjacent core members. In some examples, the rotational stacking determination made for each of the plurality of core members. Therefore, the flexibility of the rotational stacking is increased, so that the dimensional precision of the final stacked core can be improved.

In some examples, at the temporarily stacking step, the plurality of core members having a temporarily-connecting tab may be formed, by blanking a metal plate along a predetermined shape, and the stack may be formed by stacking the plurality of core members while fastening the plurality of core members together via the temporarily-connecting tabs, inside of the die. The method may further include a separating step for separating the plurality of core members by removing the temporarily-connecting tabs from the stack, after the temporarily stacking step and before the finalizing stacking step. While the temporarily-connecting tabs enable the plurality of core members to be handled integrally as one stack until the finalizing stacking step, the plurality of core members in the final stacked core may not have the temporarily-connecting tabs, and they may be bonded with one another with the adhesive. Therefore, the stacked core can be handled more easily during the production process, while an improvement of the motor characteristics is achieved at the same time.

Each of the plurality of core members may be provided with a plurality of through-holes passing therethrough in the thickness direction, and at the finalizing stacking step, the plurality of core members may be stacked sequentially on a jig that is provided with insertion pins each having a shape corresponding to corresponding one of two of the through-holes, while inserting the insertion pins into the through-holes corresponding to the respective insertion pins. In some examples, the plurality of core members are aligned to a predetermined position, at the same time as the plurality of core members are stacked without checking whether any misalignment has occurred along the surfaces of the plurality of core members at the time of stacking the plurality of core members, and after the stacking of the plurality of core member is completed. Hence, the stacked cores can be manufactured more efficiently.

An example apparatus for manufacturing a stacked core includes a die configured to blank a metal plate along a predetermined shape to form a plurality of core member, each of the plurality of core members being one blanked member or being a block in which a plurality of blanked members are joined together, and to form a stack by stacking the plurality of core member. The apparatus may additionally include a holding mechanism configured to hold one core member at a time, a supplying mechanism configured to supply adhesive to the core member, and a control unit. The control unit is configured to perform a temporary stacking process for forming a stack by controlling the die, and to perform a finalizing stacking process for causing the holding mechanism to hold and take out one core member at a time from the stack and to stack the core members. In some examples, the finalizing stacking process may be performed while the control unit causes the supplying mechanism to supply adhesive to each of the plurality of core members in such a manner that the adhesive is placed between the adjacent core members, by controlling the holding mechanism and the supplying mechanism.

The apparatus may further include an oil removing mechanism configured to remove oil applied on the stack. Additionally, the control unit may be configured to further execute an oil removing process for removing the oil applied on the stack having been taken out of the die, by controlling the oil removing mechanism, after the temporarily stacking process and before the finalizing stacking process.

In some examples, the oil removing mechanism may be an annealing furnace configured to anneal the stack.

The apparatus may further include a measuring mechanism configured to measure a thickness of the core member, and the control unit may be configured to execute one or more instructions, at the finalizing stacking process, causing the holding mechanism to take out one core member at a time from the stack having the oil removed at the temporarily stacking process, and measuring a thickness of each of the plurality of core members, by controlling the holding mechanism and the measuring mechanism. The control unit may be configured to determine whether rotational stacking is to be used for each of the plurality of core members, based on the measurement result of the thickness of the core member, as measured by the measuring mechanism. Additionally, the control unit may be configured to cause the holding mechanism to stack the core members based on a result of determining whether the rotational stacking is to be used, while causing the supplying mechanism to supply adhesive to each of the plurality of core members in such a manner that the adhesive is placed between the adjacent core members, by controlling the holding mechanism and the supplying mechanism.

In some examples, the die may be configured to form the plurality of core members having a temporarily-connecting tab, by blanking a metal plate along a predetermined shape, and to form the stack by stacking the plurality of core members while fastening the plurality of core members to one another via the temporarily-connecting tabs. The apparatus may further include a temporarily-connecting tab removing mechanism configured to remove the temporarily-connecting tab from the stack. The control unit may further perform a separating process for separating the plurality of core members by removing the temporarily-connecting tab from the stack by controlling the temporarily-connecting tab removing mechanism, after the temporarily stacking process and before the finalizing stacking process.

In some examples, each of the plurality of core members formed in the die may be provided with a plurality of through-holes passing therethrough in the thickness direction. The apparatus may further include a jig that is provided with insertion pins each having a shape corresponding to corresponding one of two of the through-holes. The control unit may be configured, at the finalizing stacking process, to stack the plurality of core member sequentially on the jig, while inserting the insertion pins into the through-holes corresponding to the respective insertion pins.

We claim all modifications and variations coming within the spirit and scope of the subject matter claimed herein.

The invention claimed is:

1. A method of manufacturing a stacked core comprising:
blanking a metal plate along a predetermined shape to form a plurality of core members, each of the plurality of core members being one blanked member or being a block in which a plurality of blanked members are joined together;
forming a stack by stacking the plurality of core members inside of a die;
discharging the stack from the die after forming the stack;
removing one core member at a time from the stack after discharging the stack from the die;
separately supplying adhesive to each of the plurality of core members having been individually removed from the stack; and stacking the plurality of core members outside of the die while supplying the adhesive so that the adhesive is placed between adjacent core members of the plurality of core members.

2. The method according to claim 1, further comprising removing oil from the stack after discharging the stack from the die and before supplying the adhesive.

3. The method according to claim 2,
wherein removing oil from the stack includes annealing the stack.

4. The method according to claim 2, wherein stacking the plurality of core members includes:
removing one core member at a time from the stack after the oil has been removed;
measuring a thickness of the one core member removed from the stack; and
stacking the plurality of core members while changing an orientation of the one core member based on the thickness of the one core member.

5. The method according to claim 1, wherein forming the stack includes blanking the metal plate along a predetermined shape to form the plurality of core members, each of the plurality of core members having a temporarily-connecting tab, and stacking the plurality of core members while fastening the plurality of core members together via the temporarily-connecting tabs inside of the die, and
wherein the method further comprising separating the plurality of core members by removing, from the stack, the temporarily-connecting tabs after forming the stack and before supplying the adhesive.

6. The method according to claim 1,
wherein each of the plurality of core members includes a first through hole and a second through hole passing therethrough in a thickness direction of the stack, and
wherein stacking the plurality of core members includes stacking the plurality of core members on a jig including a first insertion pin having a shape corresponding to the first through hole and a second insertion pin having a shape corresponding to the second through hole so that the first insertion pin is inserted into the first through hole and the second insertion pin is inserted into the second through hole.

* * * * *